United States Patent
Asai et al.

(10) Patent No.: US 10,141,590 B2
(45) Date of Patent: Nov. 27, 2018

(54) FUEL CELL SYSTEM AND METHOD OF CONTROLLING FUEL CELL SYSTEM

(71) Applicant: NISSAN MOTOR CO., LTD., Yokohama-shi, Kanagawa (JP)

(72) Inventors: Yoshitomo Asai, Kanagawa (JP); Hiroshi Takeda, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 155 days.

(21) Appl. No.: 14/903,523

(22) PCT Filed: Jun. 5, 2014

(86) PCT No.: PCT/JP2014/064982
§ 371 (c)(1),
(2) Date: Jan. 7, 2016

(87) PCT Pub. No.: WO2015/005034
PCT Pub. Date: Jan. 15, 2015

(65) Prior Publication Data
US 2016/0149242 A1    May 26, 2016

(30) Foreign Application Priority Data

Jul. 11, 2013  (JP) .................................. 2013-145701

(51) Int. Cl.
*H01M 8/04746*    (2016.01)
*H01M 8/04089*    (2016.01)
(Continued)

(52) U.S. Cl.
CPC ... *H01M 8/04753* (2013.01); *H01M 8/04104* (2013.01); *H01M 8/04179* (2013.01);
(Continued)

(58) Field of Classification Search
CPC ......... H01M 8/04753; H01M 8/04104; H01M 8/04179; H01M 8/04231; H01M 8/04388;
(Continued)

(56) References Cited

U.S. PATENT DOCUMENTS

| 6,376,110 B1 * | 4/2002 | Koschany ......... H01M 8/04291 429/413 |
| 2008/0193804 A1 * | 8/2008 | Suzuki .............. H01M 8/04029 429/415 |

(Continued)

FOREIGN PATENT DOCUMENTS

| EP | 1 447 870 A1 | 8/2004 |
| JP | 2003217624 A * | 7/2003 |

(Continued)

OTHER PUBLICATIONS

English machine translation of Hirano (JP 2003217624 A) (Year: 2007).*

*Primary Examiner* — Wojciech Haske
(74) *Attorney, Agent, or Firm* — Foley & Lardner LLP

(57) ABSTRACT

A fuel cell system includes a compressor, a relief valve that adjusts a pressure of a cathode gas, a pulsation operation unit that pulsates an anode gas pressure, a target flow rate setting unit that sets a target flow rate of the cathode gas, a first target pressure setting unit that sets a first target pressure of the cathode gas, a second target pressure setting unit that sets a second target pressure of the cathode gas for maintaining a pressure difference between an anode and a cathode within a predetermined allowable range, a target pressure setting unit that sets the higher one of the first and second target pressures as a target pressure, and a control unit that controls the compressor on the basis of the target flow rate and a limitative pressure obtained by limiting pulsation of the target pressure.

7 Claims, 8 Drawing Sheets

(51) Int. Cl.
  *H01M 8/0438*   (2016.01)
  *H01M 8/04119*  (2016.01)
  *H01M 8/04223*  (2016.01)
  *H01M 8/04828*  (2016.01)
  *H01M 8/0432*   (2016.01)

(52) U.S. Cl.
  CPC ... *H01M 8/04231* (2013.01); *H01M 8/04388* (2013.01); *H01M 8/04395* (2013.01); *H01M 8/0485* (2013.01); *H01M 8/04335* (2013.01)

(58) Field of Classification Search
  CPC ......... H01M 8/04335; H01M 8/04395; H01M 8/0485
  See application file for complete search history.

(56) References Cited

U.S. PATENT DOCUMENTS

| | | | |
|---|---|---|---|
| 2012/0107711 A1* | 5/2012 | Tomita | H01M 8/04388 429/446 |
| 2013/0089801 A1 | 4/2013 | Takeshita et al. | |
| 2016/0156046 A1 | 6/2016 | Asai et al. | |

FOREIGN PATENT DOCUMENTS

| | | |
|---|---|---|
| JP | 2006-278046 A | 10/2006 |
| JP | 2012-003957 A | 1/2012 |

* cited by examiner

FUEL CELL SYSTEM AND METHOD OF CONTROLLING FUEL CELL SYSTEM

TECHNICAL FIELD

This invention relates to a fuel cell system and a method of controlling the fuel cell system.

BACKGROUND ART

In JP 2012-003957 A, there is discussed a fuel cell system of the prior art, in which a flow rate and a pressure of a cathode gas are controlled to target values by controlling a compressor and a relief valve.

SUMMARY OF INVENTION

In currently developing fuel cell systems, a target flow rate and a target pressure of a cathode gas are set on the basis of a fuel cell condition, and a compressor supply flow rate and an opening level of a relief valve are controlled to obtain the target flow rate and the target pressure. For example, in order to control the compressor supply flow rate, a rotation speed of the compressor is controlled on the basis of the target flow rate and the target pressure.

In currently developing fuel cell systems, a study has been made for a pulsation operation for pulsating the anode gas pressure. When the pulsation operation is performed, a pressure difference between anode and cathode electrolyte membranes of the fuel cell (hereinafter, referred to as an "inter-membrane pressure difference") varies in response to pulsation of the anode gas pressure. If the inter-membrane pressure difference is excessive, an unexpected stress is applied to the electrolyte membrane, and this may deteriorate the fuel cell.

Therefore, if a target pressure of the cathode gas set on the basis of the fuel cell condition is below a lower limit pressure for membrane protection obtained by subtracting an allowable inter-membrane pressure difference from the anode gas pressure, it is desirable to set the lower limit pressure for membrane protection as the target pressure.

However, since the lower limit pressure for membrane protection is calculated on the basis of the anode gas pressure, the lower limit pressure is pulsated (changes) in response to pressure pulsation of the anode gas.

For this reason, if the lower limit pressure for membrane protection is set as the target pressure of the cathode gas, and the compressor is controlled on the basis of the target pressure and the target flow rate, the rotation speed of the compressor periodically changes in response to pulsation of the target pressure, so that noise such as a beating sound may be generated from the compressor disadvantageously.

In view of the aforementioned problems, it is therefore an object of this invention to provide a fuel cell system having a compressor controlled on the basis of a target flow rate and a target pressure of a cathode gas, capable of suppressing generation of noise from the compressor.

According to one embodiment, a fuel cell system that generates power by supplying anode and cathode gases to a fuel cell, comprising a compressor configured to adjust a flow rate of the cathode gas supplied to the fuel cell, a relief valve configured to adjust a pressure of the cathode gas supplied to the fuel cell, a pulsation operation unit configured to pulsate an anode gas pressure, a target flow rate setting unit configured to set a target flow rate of the cathode gas on the basis of a request from the fuel cell, a first target pressure setting unit configured to set a first target pressure of the cathode gas on the basis of a request from the fuel cell, a second target pressure setting unit configured to set a second target pressure of the cathode gas for maintaining a pressure difference between an anode and a cathode of the fuel cell within a predetermined allowable pressure difference range, a target pressure setting unit configured to set the higher one of the first and second target pressures as a target pressure, and a control unit configured to control the compressor and the relief valve on the basis of the target flow rate and the target pressure. The control unit controls the compressor on the basis of the target flow rate and a limitative pressure obtained by limiting pulsation of the target pressure when the target pressure is pulsated in response to pressure pulsation of the anode gas.

DESCRIPTION OF EMBODIMENTS

A description will now be made for embodiments of this invention with reference to the accompanying drawings.

First Embodiment

A fuel cell has an electrode membrane interposed between an anode (fuel electrode) and a cathode (oxidant electrode) and generates electric power by supplying an anode gas (fuel gas) containing hydrogen to the anode and supplying a cathode gas (oxidant gas) containing oxygen to the cathode. An electrode reaction generated in both electrodes (anode and cathode) can be expressed as follows.

$$\text{Anode: } 2H_2 \rightarrow 4H^+ + 4e^- \qquad (1)$$

$$\text{Cathode: } 4H^+ + 4e^- + O_2 \rightarrow 2H_2O \qquad (2)$$

Through the electrode reactions (1) and (2), the fuel cell generates an electromotive force of approximately 1 V.

Since a necessary power level is high when the fuel cell is employed as a power source of a vehicle, a fuel cell stack obtained by stacking several hundreds of fuel cells is employed. In addition, a fuel cell system for supplying anode and cathode gases to the fuel cell stack is provided in order to obtain power for driving a vehicle.

Figure 1:
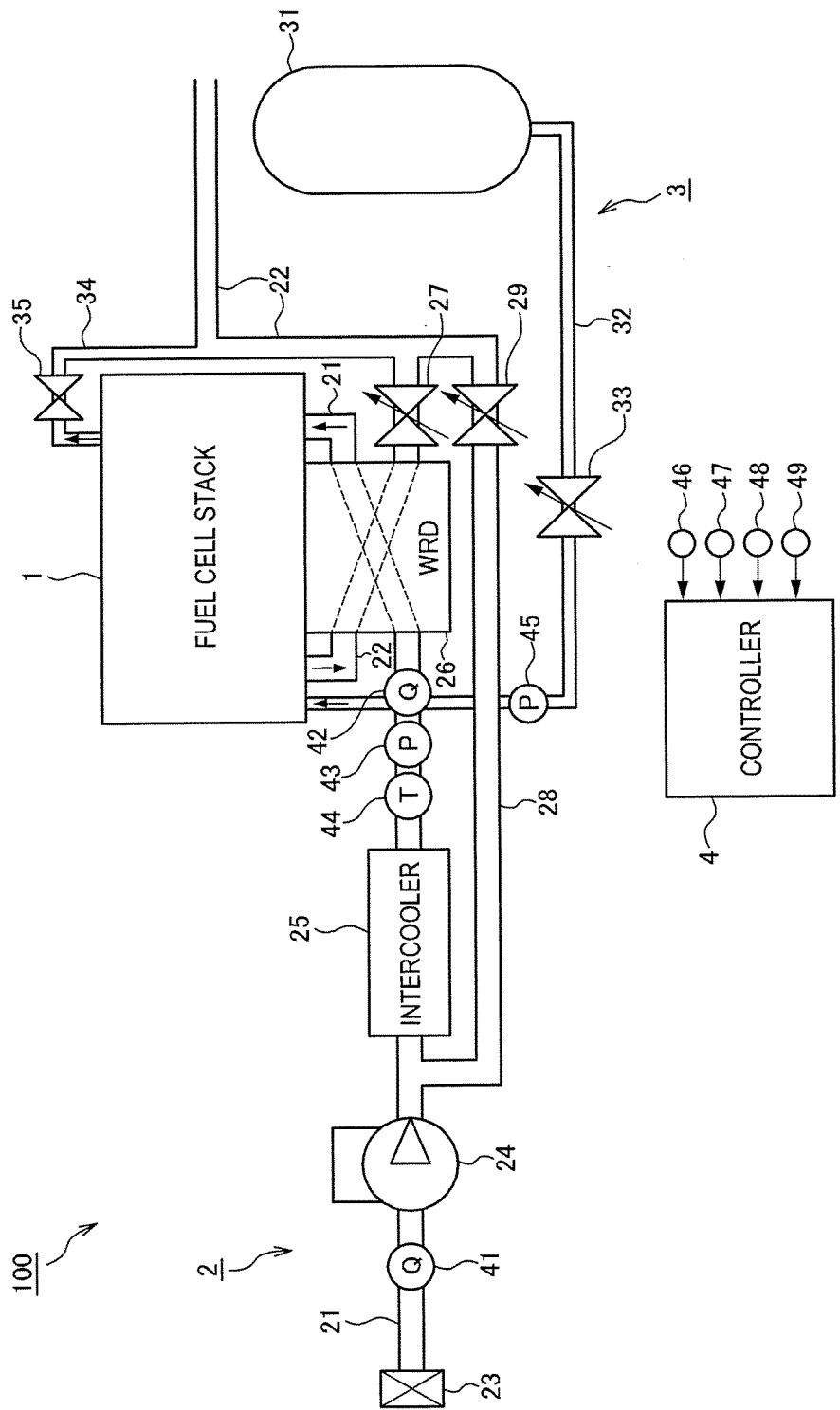
FIG. 1 is a schematic diagram illustrating a fuel cell system according to a first embodiment of this invention.

FIG. 1 is a schematic diagram illustrating a fuel cell system 100 according to a first embodiment of this invention.

The fuel cell system 100 has a fuel cell stack 1, a cathode gas ventilation device 2, an anode gas ventilation device 3, and a controller 4.

The fuel cell stack 1 is formed by stacking several hundreds of fuel cells and is supplied with anode and cathode gases to generate power necessary to drive a vehicle.

The cathode gas ventilation device 2 supplies the fuel cell stack 1 with a cathode gas (air) and discharges a cathode off-gas from the fuel cell stack 1 to the outside. The cathode gas ventilation device 2 has a cathode gas supply passage 21, a cathode gas discharge passage 22, a filter 23, a cathode compressor 24, an intercooler 25, a water recovery device (WRD) 26, a cathode relief valve 27, a bypass passage 28, a bypass valve 29, a first airflow sensor 41, a second airflow sensor 42, a cathode pressure sensor 43, and a temperature sensor 44.

The cathode gas supply passage 21 is a passage for flowing the cathode gas supplied to the fuel cell stack 1. The cathode gas supply passage 21 has one end connected to the filter 23 and the other end connected to a cathode gas inlet port of the fuel cell stack 1.

The cathode gas discharge passage 22 is a passage for flowing a cathode off-gas discharged from the fuel cell stack 1. The cathode gas discharge passage 22 has one end connected to a cathode gas outlet port of the fuel cell stack 1 and the other end serving as an opening end. The cathode off-gas is a mixed gas including remaining oxygen not used in the electrode reaction, nitrogen contained in the cathode gas, water vapor generated through the electrode reaction, and the like.

The filter 23 filters a foreign object out of the cathode gas incorporated into the cathode gas supply passage 21.

The cathode compressor 24 is provided in the cathode gas supply passage 21. The cathode compressor 24 incorporates the air as a cathode gas into the cathode gas supply passage 21 through the filter 23 and supplies the cathode gas to the fuel cell stack 1.

The intercooler 25 is provided in the cathode gas supply passage 21 in the downstream from the cathode compressor 24. The intercooler 25 cools the cathode gas discharged from the cathode compressor 24.

The WRD 26 is connected to each of the cathode gas supply passage 21 and the cathode gas discharge passage 22 to recover a water content out of the cathode off-gas flowing through the cathode gas discharge passage 22 and moisturize the cathode gas flowing through the cathode gas supply passage 21 using the recovered water content.

The cathode relief valve 27 is provided in the cathode gas discharge passage 22 in the downstream from the WRD 26. The open/close operation of the cathode relief valve 27 is controlled by the controller 4 to adjust the cathode gas pressure supplied to the fuel cell stack 1 to a desired pressure.

The bypass passage 28 is a passage provided to directly discharge a part of the cathode gas discharged from the cathode compressor 24 to the cathode gas discharge passage 22 without passing through the fuel cell stack 1 as necessary. The bypass passage 28 has one end connected to the cathode gas supply passage 21 between the cathode compressor 24 and the intercooler 25 and the other end connected to the cathode gas discharge passage 22 in the downstream from the cathode relief valve 27.

The bypass valve 29 is provided in the bypass passage 28. The open/close operation of the bypass valve 29 is controlled by the controller 4 to adjust a flow rate of the cathode gas flowing through the bypass passage 28 (hereinafter, referred to as a "bypass flow rate").

The first airflow sensor 41 is provided in the cathode gas supply passage 21 in the upstream from the cathode compressor 24. The first airflow sensor 41 detects a flow rate of the cathode gas supplied to the cathode compressor 24 (hereinafter, referred to as a "compressor supply flow rate").

The second airflow sensor 42 is provided in the cathode gas supply passage in the downstream from a portion coupled to the bypass passage 28. The second airflow sensor 42 detects a flow rate of the cathode gas supplied to the fuel cell stack 1 (hereinafter, referred to as a "stack supply flow rate") out of the cathode gas discharged from the cathode compressor 24. The stack supply flow rate is a flow rate obtained by subtracting the bypass flow rate from the compressor supply flow rate.

The cathode pressure sensor 43 is provided in the cathode gas supply passage 21 in the vicinity of the cathode gas inlet port of the WRD 26. The cathode pressure sensor 43 detects a pressure of the cathode gas in the vicinity of the cathode gas inlet port of the WRD 26 (hereinafter, referred to as a "cathode pressure").

The temperature sensor 44 is provided in the cathode gas supply passage 21 between the intercooler 25 and the WRD 26. The temperature sensor 44 detects a temperature in the cathode gas inlet port side of the WRD 26 (hereinafter, referred to as a "WRD inlet temperature").

The anode gas ventilation device 3 supplies the fuel cell stack 1 with the anode gas and discharges, to the cathode gas discharge passage 22, the anode off-gas discharged from the fuel cell stack 1. The anode gas ventilation device 3 has a high-pressure reservoir 31, an anode gas supply passage 32, an anode relief valve 33, an anode gas discharge passage 34, a purge valve 35, and an anode pressure sensor 45.

The high-pressure reservoir 31 stores the anode gas (hydrogen) supplied to the fuel cell stack 1 in a high pressure state.

The anode gas supply passage 32 is a passage for supplying the fuel cell stack 1 with the anode gas discharged from the high-pressure reservoir 31. The anode gas supply passage 32 has one end connected to the high-pressure reservoir 31 and the other end connected to the anode gas inlet port of the fuel cell stack 1.

The anode relief valve 33 is provided in the anode gas supply passage 32. The open/close operation of the anode relief valve 33 is controlled by the controller 4 to adjust the anode gas pressure supplied to the fuel cell stack 1 to a desired pressure.

The anode gas discharge passage 34 is a passage for flowing the anode off-gas discharged from the fuel cell stack 1. The anode gas discharge passage 34 has one end connected to the anode gas outlet port of the fuel cell stack 1 and the other end connected to the cathode gas discharge passage 22.

The anode off-gas discharged to the cathode gas discharge passage 22 through the anode gas discharge passage 34 is mixed with the cathode off-gas in the cathode gas discharge passage 22 and is discharged to the outside of the fuel cell system 100. Since the anode off-gas contains the extra anode gas not used in the electrode reaction, a hydrogen concentration of the exhaust gas is adjusted to a preset concentration or lower by mixing it with the cathode off-gas and discharging the mixed gas to the outside of the fuel cell system 100.

The purge valve 35 is provided in the anode gas discharge passage 34. The open/close operation of the purge valve 35 is controlled by the controller 4 to adjust a flow rate of the anode off-gas discharged from the anode gas discharge passage 34 to the cathode gas discharge passage 22.

The anode pressure sensor 45 is provided in the anode gas supply passage 32 in the downstream from the anode relief valve 33 to detect the anode gas pressure supplied to the fuel cell stack 1 (hereinafter, referred to as an "anode pressure").

The controller 4 is a microcomputer having a central processing unit (CPU), a read-only memory (ROM), a random access memory (RAM), and an input/output (I/O) interface.

The controller 4 also receives signals from various sensors such as an electric current sensor 46 configured to detect an electric current (output current) from the fuel cell stack 1, a voltage sensor 47 configured to detect the output voltage of the fuel cell stack 1, an accelerator stroke sensor 48 configured to detect an acceleration pedal depression level (hereinafter, referred to as an "acceleration level"), and a state-of-charge (SOC) sensor 49 configured to detect a state of charge of the battery in addition to the first airflow sensor 41 described above. The controller 4 detects an operation condition of the fuel cell system 100 on the basis of the signals from these various sensors.

The controller 4 performs control for the supply of the anode gas to the fuel cell stack 1 so as to pulsate the anode pressure and the supply of the cathode gas to the fuel cell stack 1 on the basis of the operation condition of the fuel cell system 100. A description will now be made for the anode gas supply control and the cathode gas supply control performed by the controller 4.

Figure 2:
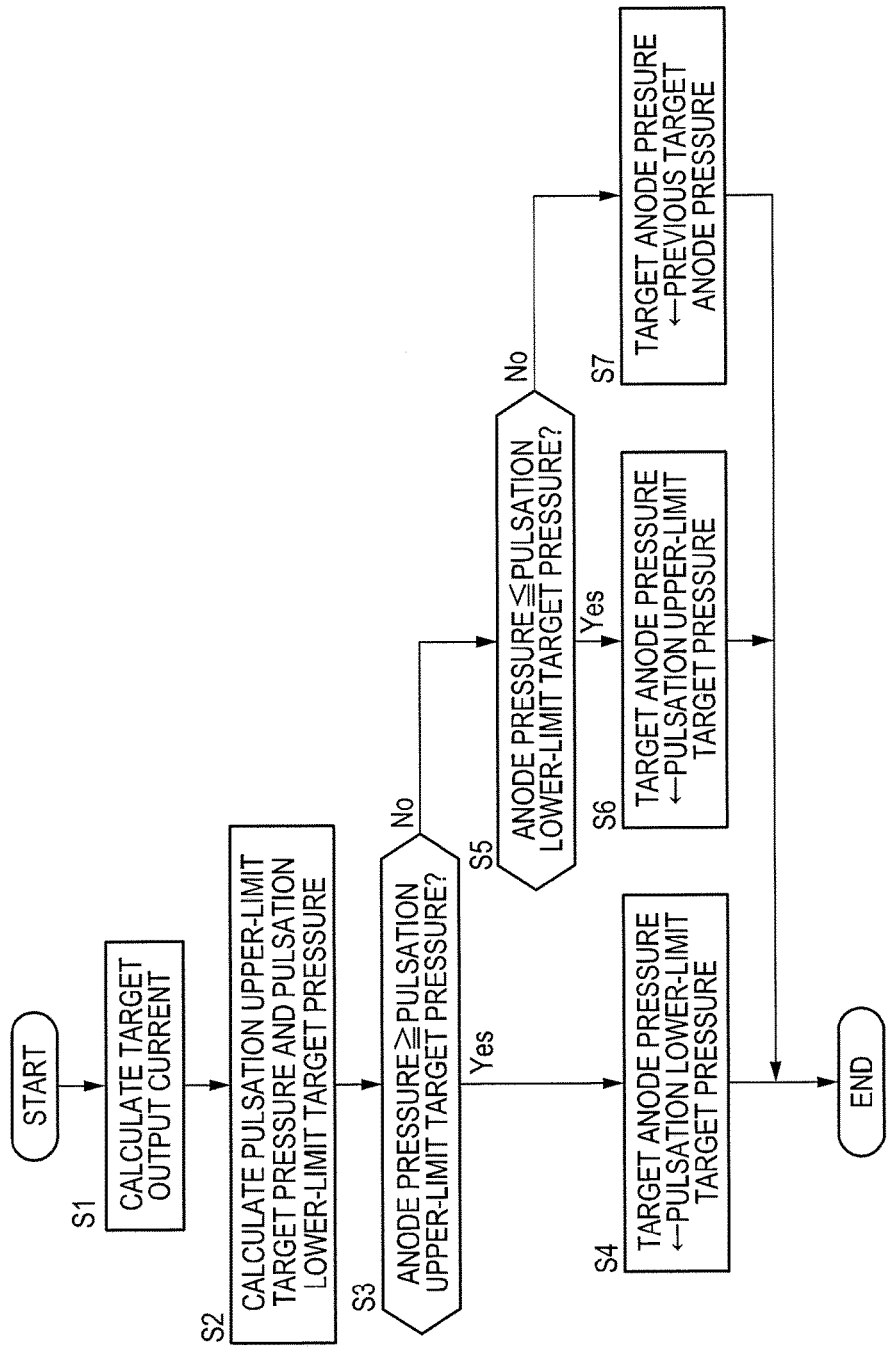
FIG. 2 is a flowchart illustrating an anode gas supply control according to the first embodiment of this invention.

FIG. 2 is a flow chart illustrating the anode gas supply control performed by the controller 4 (pulsation operation unit) according to this embodiment.

In step S1, the controller 4 calculates a target output current of the fuel cell stack 1 on the basis of an operation condition of the fuel cell system 100. Specifically, the controller 4 calculates the target output power of the fuel cell stack 1 on the basis of electric power necessary in a driving motor (not shown) for generating a driving force of a vehicle and accessories such as the cathode compressor 24 or a battery charge/discharge request, and calculates the target output current on the basis of the target output power by referencing I-V characteristics of the fuel cell stack 1.

Figure 3:
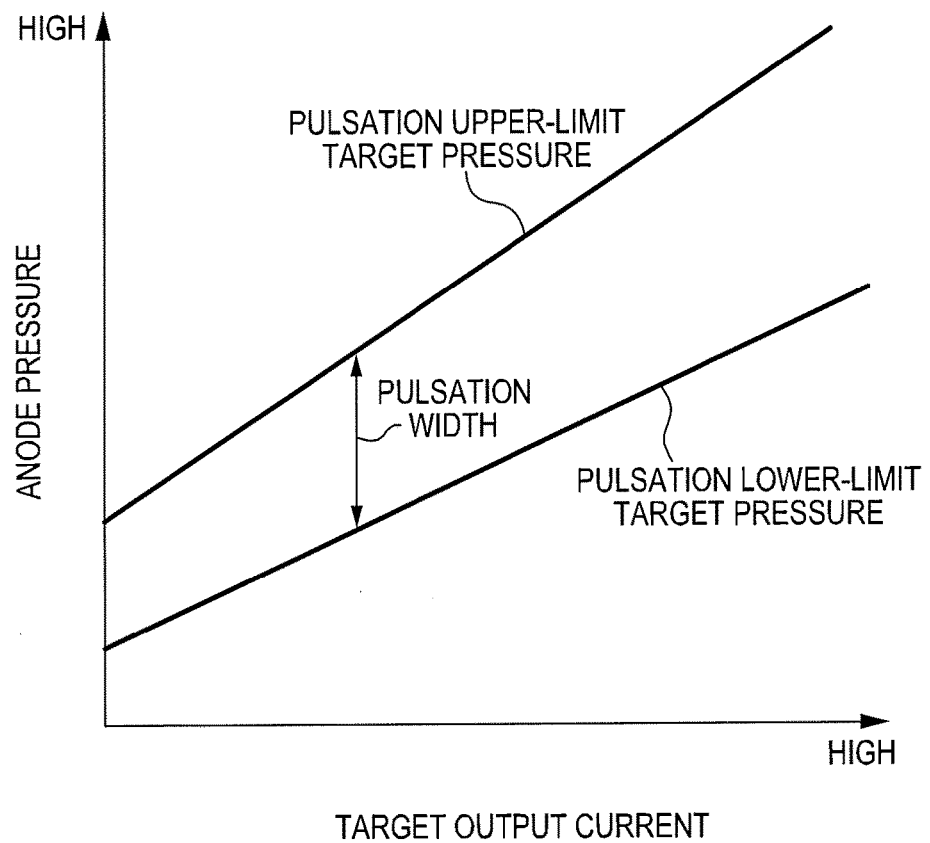
FIG. 3 is a graph for calculating a pulsation upper-limit target pressure and a pulsation lower-limit target pressure on the basis of a target output current.

In step S2, the controller 4 calculates a pulsation upper-limit target pressure and a pulsation lower-limit target pressure on the basis of the target output current by referencing the graph of FIG. 3. As illustrated in the graph of FIG. 3, both the pulsation upper-limit target pressure and the pulsation lower-limit target pressure increase when the target output current is higher rather than when it is lower. Similarly, the pulsation width increases when the target output current is higher rather than when it is lower. In this manner, the controller 4 changes the pulsation upper-limit target pressure (pulsation upper-limit pressure) and the pulsation lower-limit target pressure (pulsation lower-limit pressure) of the anode gas on the basis of a load of the fuel cell stack 1 (target output current).

In step S3, the controller 4 determines whether or not the anode pressure is higher than the pulsation upper-limit target pressure. If the anode pressure is equal to or higher than the pulsation upper-limit target pressure, the controller 4 performs the processing of step S4 in order to lower the anode pressure. Meanwhile, if the anode pressure is lower than the pulsation upper-limit target pressure, the controller 4 performs the processing of step S5.

In step S4, the controller 4 sets the target anode pressure to the pulsation lower-limit target pressure. As a result, a feedback control is performed for the opening level of the anode relief valve 33 such that the anode pressure is set to the pulsation lower-limit target pressure. As a result of this feedback control, typically, the anode relief valve 33 is fully closed, so that the supply of the anode gas from the high-pressure reservoir 31 to the fuel cell stack 1 stops. As a result, due to consumption of the anode gas of the fuel cell stack 1 through power generation, the anode pressure decreases gradually.

In step S5, the controller 4 determines whether or not the anode pressure is equal to or lower than the pulsation lower-limit target pressure. If the anode pressure is equal to or lower than the pulsation lower-limit target pressure, the controller 4 performs the processing of step S6 in order to boost the anode pressure. Meanwhile, if the anode pressure is higher than the pulsation lower-limit target pressure, the controller 4 performs the processing of step S7.

In step S6, the controller 4 sets the target anode pressure to the pulsation upper-limit target pressure. As a result, a feedback control is performed for the opening level of the anode relief valve 33 such that the anode pressure is set to the pulsation upper-limit target pressure. As a result of this feedback control, the anode relief valve 33 is opened to a desired opening level, and the anode gas is supplied from the high-pressure reservoir 31 to the fuel cell stack 1, so that the anode pressure increases.

In step S7, the controller 4 sets the target anode pressure to the previous one.

Here, when such a pulsation operation is performed, the inter-membrane pressure difference between electrolyte membranes between the anode and the cathode of each fuel cell changes as the anode pressure is pulsated. If this inter-membrane pressure difference becomes excessive, an unexpected stress is applied to the electrolyte membrane, so that a mechanical strength of the electrolyte membrane may be degraded, and this may deteriorate the fuel cell.

As a method of suppressing such deterioration of the fuel cell, it may be conceived that, if the target cathode pressure set on the basis of the operation condition of the fuel cell system 100 is below the lower limit pressure for membrane protection obtained by subtracting a predetermined allowable inter-membrane pressure difference from the anode pressure, this lower limit pressure is set as the target cathode pressure.

However, in this method, since the lower limit pressure for membrane protection is calculated on the basis of the pulsating anode pressure, the lower limit pressure is also pulsated.

Then, when the lower limit pressure is set as the target cathode pressure, the target cathode pressure is pulsated. As a result, the rotation speed of the cathode compressor 24 controlled on the basis of the target cathode pressure periodically changes in response to pulsation of the target cathode pressure, so that noise such as a beating sound may be generated from the cathode compressor 24 disadvantageously.

In this regard, according to this embodiment, when the target cathode pressure is pulsated in response to pulsation of the anode pressure in this manner, a pressure obtained by limiting pulsation of the target cathode pressure is set as the limitative target cathode pressure, and the cathode compressor 24 is controlled on the basis of this limitative target cathode pressure. Specifically, an inter-membrane pressure difference limitation request target pressure obtained by subtracting the allowable inter-membrane pressure difference from the pulsation upper-limit target pressure is set as the limitative target cathode pressure.

The pulsation upper-limit target pressure is fixed to a predetermined value determined depending on the target output current if there is no change in the target output current. Therefore, the inter-membrane pressure difference limitation request target pressure obtained by subtracting the allowable inter-membrane pressure difference from the pulsation upper-limit target pressure is also fixed to any predetermined value. For this reason, when the target cathode pressure is pulsated in response to pulsation of the anode pressure, it is possible to suppress pulsation of the rotation speed of the cathode compressor 24 by controlling the cathode compressor 24 on the basis of the inter-membrane pressure difference limitation request target pressure fixed to a predetermined value. A description will now be made for the cathode gas supply control according to this embodiment.

Figure 4:
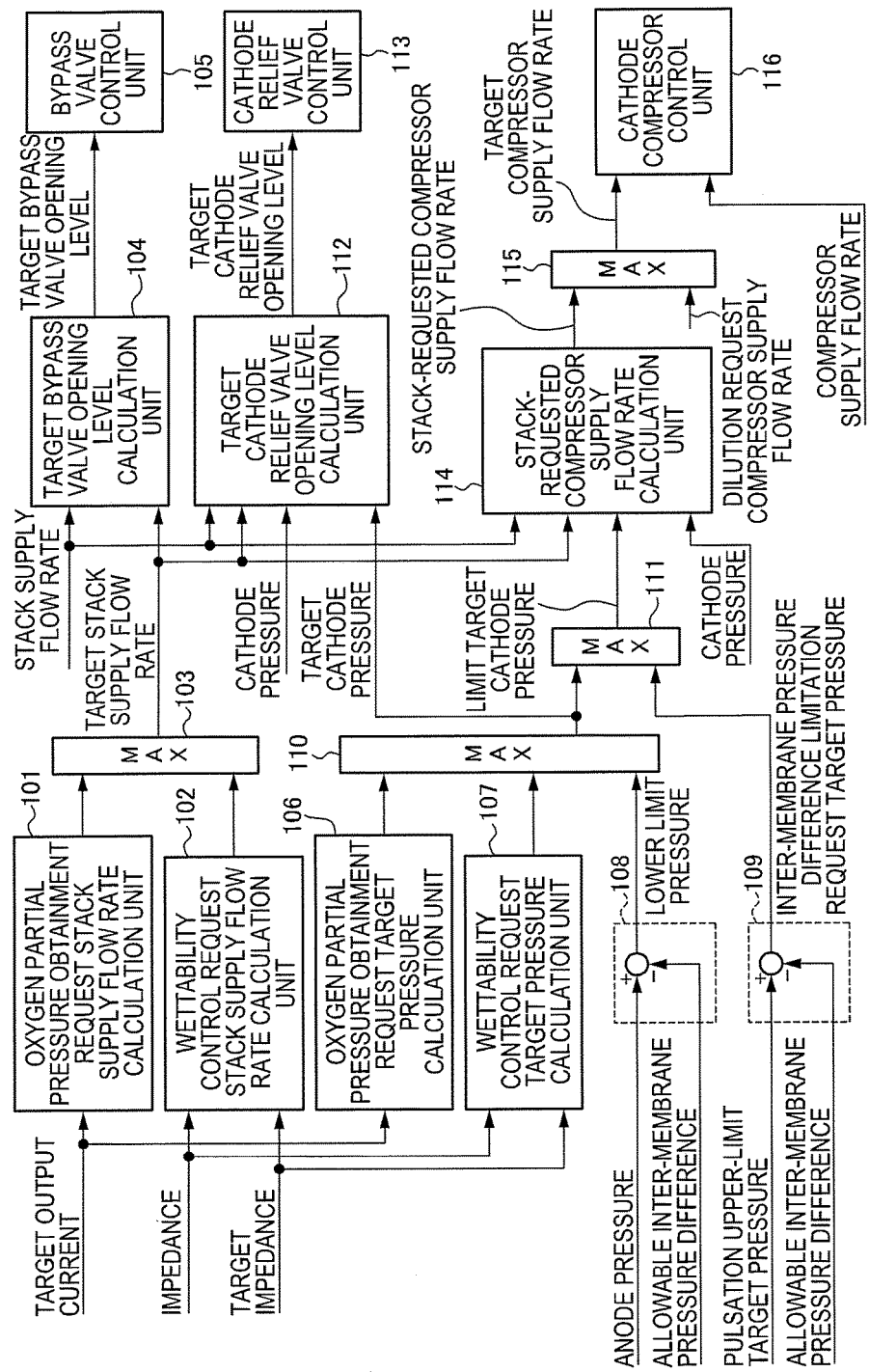
FIG. 4 is a block diagram illustrating a cathode gas supply control according to the first embodiment of this invention.

FIG. 4 is a block diagram illustrating a cathode gas supply control performed by the controller 4 according to this embodiment.

The target output current is input to the oxygen partial pressure obtainment request stack supply flow rate calculation unit 101. The oxygen partial pressure obtainment request stack supply flow rate calculation unit 101 calculates an oxygen partial pressure obtainment request stack supply flow rate on the basis of the target output current. This oxygen partial pressure obtainment request stack supply flow rate is a target value of the stack supply flow rate necessary to obtain an oxygen partial pressure necessary in the electrode reaction of the cathode of each fuel cell when the target output current is extracted from the fuel cell stack 1. The oxygen partial pressure obtainment request stack supply flow rate is higher when the target output current is large, compared to when it is small.

A wettability control request stack supply flow rate calculation unit 102 receives, for example, an impedance of the fuel cell stack 1 calculated using an AC impedance technique and a target impedance preset on the basis of the target output current of the fuel cell stack 1. The wettability control request stack supply flow rate calculation unit 102 calculates a target value of a stack supply flow rate for setting the impedance to the target impedance on the basis of a difference between the impedance and the target impedance as a wettability control request stack supply flow rate. This wettability control request stack supply flow rate is, in other words, a stack supply flow rate necessary to control wettability of the electrolyte membrane (moisture content percentage) to an optimum value depending on the target output current of the fuel cell stack 1.

The target stack supply flow rate calculation unit 103 receives the oxygen partial pressure obtainment request stack supply flow rate and the wettability control request stack supply flow rate. The target stack supply flow rate calculation unit 103 calculates the larger one of the oxygen partial pressure obtainment request stack supply flow rate and the wettability control request stack supply flow rate as the target stack supply flow rate.

In this manner, the controller 4 (target flow rate setting unit) sets the target flow rate of the cathode gas supplied to the fuel cell stack (target stack supply flow rate) to satisfy at least two requests of the fuel cell stack 1 including the oxygen partial pressure obtainment request and the wettability control request.

The target bypass valve opening level calculation unit 104 receives the stack supply flow rate and the target stack supply flow rate. The target bypass valve opening level calculation unit 104 calculates, as a target bypass valve opening level, the opening level of the bypass valve 29 for setting the stack supply flow rate to the target stack supply flow rate on the basis of a difference between the stack supply flow rate and the target stack supply flow rate.

The bypass valve control unit 105 receives the target bypass valve opening level. The bypass valve control unit 105 controls the opening level of the bypass valve 29 to the target bypass valve opening level.

The oxygen partial pressure obtainment request target pressure calculation unit 106 receives the target output current. The oxygen partial pressure obtainment request target pressure calculation unit 106 calculates the oxygen partial pressure obtainment request target pressure on the basis of the target output current. This oxygen partial pressure obtainment request target pressure is a target value of the cathode pressure necessary to obtain an oxygen partial pressure necessary in the electrode reaction of the cathode of each fuel cell when the target output current is extracted from the fuel cell stack 1. The oxygen partial pressure obtainment request target pressure is higher when the target output current is large, compared to when it is small.

In this manner, the controller 4 (oxygen partial pressure obtainment request pressure calculation unit) calculates the oxygen partial pressure obtainment request pressure necessary to maintain the oxygen partial pressure of each fuel cell to be equal to or higher than a predetermined value (oxygen partial pressure obtainment request target pressure) on the basis of a load of the fuel cell stack 1 (target output current).

The wettability control request target pressure calculation unit 107 receives an impedance of the fuel cell stack 1 and a target impedance preset on the basis of the target output current of the fuel cell stack 1. The wettability control request target pressure calculation unit 107 calculates, as a wettability control request target pressure, a target value of the cathode pressure for setting the impedance to the target impedance on the basis of a difference between the impedance and the target impedance. This wettability control request target pressure is a cathode pressure necessary to control wettability of the electrolyte membrane (moisture content percentage) to an optimum value depending on the target output current of the fuel cell stack 1.

In this manner, the controller 4 (target wettability calculation unit) calculates the target wettability (target impedance) of the electrolyte membrane on the basis of a load (target output current) of the fuel cell stack 1. In addition, the controller 4 (wettability control request pressure calculation unit) calculates a wettability control request pressure (wettability control request target pressure) necessary to control the wettability (impedance) of the electrolyte membrane to a target wettability (target impedance).

The lower limit pressure calculation unit 108 receives the anode pressure and the allowable inter-membrane pressure difference. The lower limit pressure calculation unit 108 calculates, as the lower limit pressure of the cathode gas, a value obtained by subtracting the allowable inter-membrane pressure difference from the anode pressure. The lower limit pressure is a lower limit value of the cathode pressure necessary to protect the electrolyte membrane and is pulsated in response to pulsation of the anode pressure when the anode pressure is pulsated. It is noted that the allowable inter-membrane pressure difference is a predetermined value that may be obtained by appropriately setting a maximum value allowable as the inter-membrane pressure difference (hereinafter, referred to as an "allowable maximum inter-membrane pressure difference") as an upper limit.

The inter-membrane pressure difference limitation request target pressure calculation unit 109 receives the pulsation upper-limit target pressure (pulsation upper-limit pressure) and the allowable inter-membrane pressure difference. The inter-membrane pressure difference limitation request target pressure calculation unit 109 calculates the inter-membrane pressure difference limitation request target pressure (limitative pressure) by subtracting the allowable inter-membrane pressure difference from the pulsation upper-limit target pressure.

The target cathode pressure calculation unit 110 receives the oxygen partial pressure obtainment request target pressure, the wettability control request target pressure, and the lower limit pressure. The target cathode pressure calculation unit 110 sets, as a first target pressure, the higher one out of the oxygen partial pressure obtainment request target pressure and the wettability control request target pressure, and calculates, as the target cathode pressure, the higher one of the first target pressure and the lower limit pressure (second target pressure). That is, the target cathode pressure calculation unit 110 calculates the highest one of three input values as the target cathode pressure.

In this manner, the controller 4 (first target pressure setting unit) sets the first target pressure of the cathode gas to satisfy at least two requests from the fuel cell stack 1 including the oxygen partial pressure obtainment request and the wettability control request. In addition, the controller 4 (second target pressure setting unit) sets the lower limit pressure (second target pressure) of the cathode gas for maintaining the inter-membrane pressure difference between electrolyte membranes between the anode and the cathode of each fuel cell (pressure difference between the anode and the cathode) within a predetermined allowable inter-membrane pressure difference range. In addition, the controller 4 (target pressure setting unit) sets, as the target pressure of the cathode gas supplied to the fuel cell stack (target cathode pressure), the higher one of the first target pressure and the lower limit pressure (second target pressure).

The limitative target cathode pressure calculation unit 111 receives the target cathode pressure and the inter-membrane pressure difference limitation request target pressure.

The limitative target cathode pressure calculation unit 111 calculates the higher one of the input values as the limitative target cathode pressure.

The target cathode relief valve opening level calculation unit 112 receives the stack supply flow rate, the target stack supply flow rate, the cathode pressure, and the target cathode pressure. The target cathode relief valve opening level calculation unit 112 calculates the target cathode relief valve opening level on the basis of these received values.

The cathode relief valve control unit 113 receives the target cathode relief valve opening level. The cathode relief valve control unit 113 controls the opening level of the cathode relief valve 27 to the target cathode relief valve opening level.

In this manner, the controller 4 (control unit) controls the cathode relief valve 27 on the basis of the target flow rate (target stack supply flow rate) and the target pressure (target cathode pressure).

The stack-requested compressor supply flow rate calculation unit 114 receives the stack supply flow rate, the target stack supply flow rate, the cathode pressure, and the limitative target cathode pressure. The stack-requested compressor supply flow rate calculation unit 114 calculates a stack-requested compressor supply flow rate on the basis of these received values. It is noted that the stack-requested compressor supply flow rate is a compressor supply flow rate necessary to satisfy requests from the fuel cell stack 1 such as the oxygen partial pressure obtainment request or the wettability control request.

The target compressor supply flow rate calculation unit 115 receives the stack-requested compressor supply flow rate and a dilution request compressor supply flow rate determined on the basis of the target output current of the fuel cell stack 1. The target compressor supply flow rate calculation unit 115 calculates the higher one of the input values as a target compressor supply flow rate. It is noted that the dilution request compressor supply flow rate is a compressor supply flow rate necessary to set a hydrogen concentration of the exhaust gas discharged to the outside of the fuel cell system 100 to a predetermined value or lower. According to this embodiment, the dilution request compressor supply flow rate is set to be larger when the target output current is large, compared to when it is small. Alternatively, the dilution request compressor supply flow rate may be set to a constant value regardless of the target output current.

The cathode compressor control unit 116 receives the compressor supply flow rate and the target compressor supply flow rate. The cathode compressor control unit 116 calculates a torque instruction value for the cathode compressor 24 on the basis of a difference between the compressor supply flow rate and the target compressor supply flow rate and controls the cathode compressor 24 on the basis of the torque instruction value.

In this manner, the controller 4 (control unit) controls the cathode compressor 24 on the basis of the target flow rate (target stack supply flow rate) and the limitative target cathode pressure (target cathode pressure or the inter-membrane pressure difference limitation request target pressure). That is, while, basically, the controller 4 (control unit) controls the cathode compressor 24 on the basis of the target flow rate (target stack supply flow rate) and the target pressure (target cathode pressure), the lower limit pressure (second target pressure) is set to the target pressure (target cathode pressure), so that the cathode compressor 24 is controlled on the basis of the limitative pressure (inter-membrane pressure difference limitation request target pressure) for limiting pulsation of the target pressure (target cathode pressure) and the target flow rate (target stack supply flow rate) when the target pressure (target cathode pressure) is pulsated in response to pressure pulsation of the anode gas.

Figure 5:
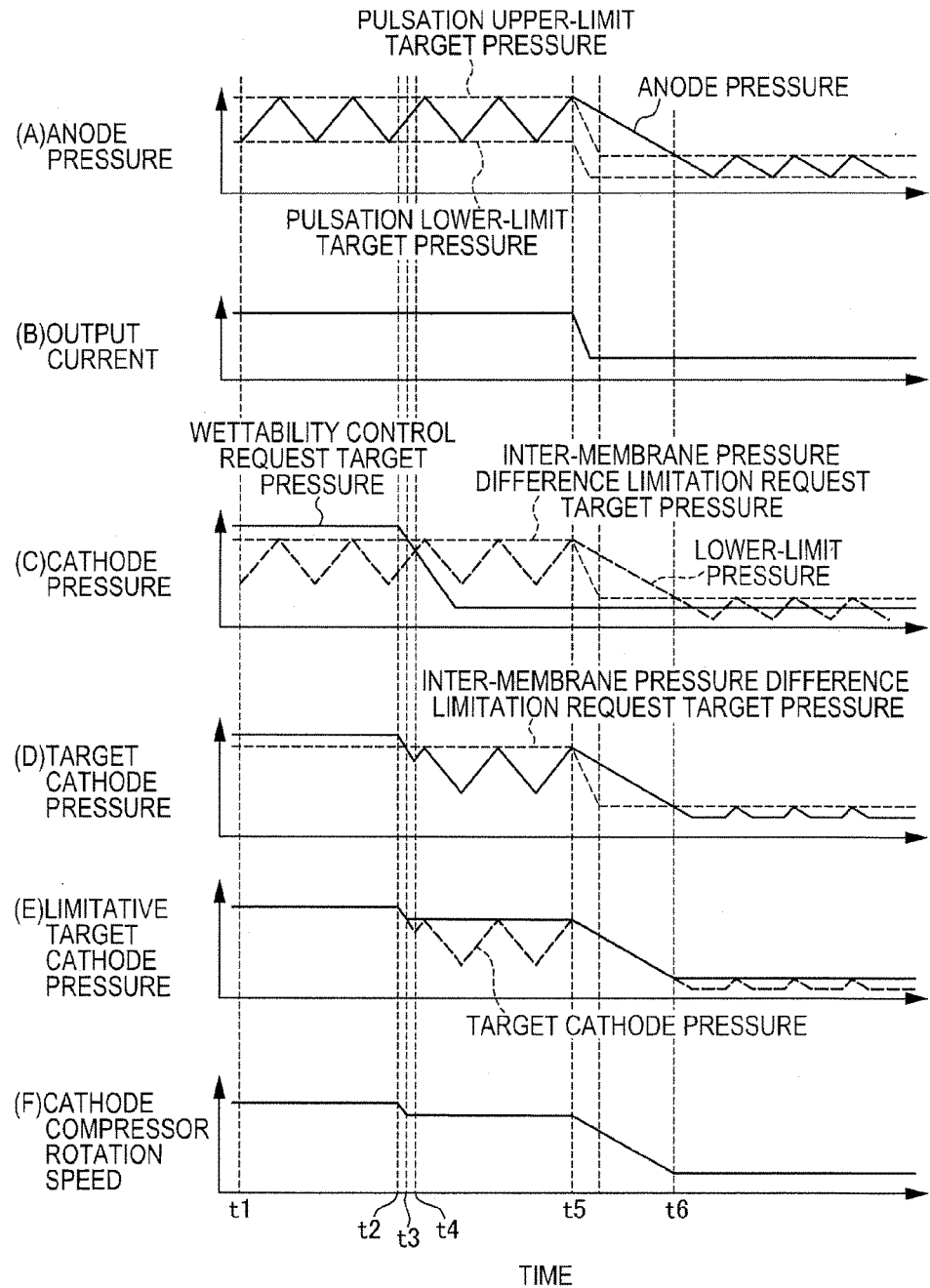
FIG. 5 is a timing chart illustrating operations of the anode gas supply control and the cathode gas supply control according to the first embodiment of this invention.

FIG. 5 is a timing chart illustrating operations of the anode gas supply control and the cathode gas supply control according to this embodiment.

First, the operation of the anode gas supply control will be described.

In this timing chart, at the timing t1, a pulsation operation is already performed for pulsating the anode pressure between the pulsation lower-limit target pressure and the pulsation upper-limit target pressure calculated on the basis of the target output current (FIG. 5A). In addition, at the timing t1 to t5, since the target output current is constant (FIG. 5B), the pulsation operation for pulsating the anode pressure between the pulsation upper-limit target pressure and the pulsation lower-limit target pressure at the timing t1 is continuously performed (FIG. 5A).

At the timing t5, for example, when the target output current decreases as the acceleration level decreases (FIG. 5B), the pulsation upper-limit target pressure and the pulsation lower-limit target pressure are also reduced in response to a decrease of the target output current (FIG. 5A).

As a result, in order to control the anode pressure to the reduced pulsation lower-limit target pressure, the anode relief valve 33 is fully closed, so that the supply of the anode gas from the high-pressure reservoir 31 to the fuel cell stack 1 stops. As a result, the anode gas inside the fuel cell stack 1 is gradually consumed through power generation, and the anode pressure decreases (FIG. 5A). In this manner, during a reductive transient time in which the target output current decreases, a decrease rate of the anode pressure depends on a consumption rate of the anode gas caused by power generation. Therefore, during the reductive transient time, the anode pressure is temporarily higher than the pulsation upper-limit target pressure in some times (FIG. 5A).

Next, the operation of the cathode gas supply control will be described. It is noted that, in this timing chart, it is assumed that the wettability control request target pressure is higher than the oxygen partial pressure obtainment request pressure, and the stack-requested compressor supply flow rate is higher than the dilution request compressor supply flow rate.

At the timing t1, the wettability control request target pressure is higher than the lower limit pressure (FIG. 5C). Therefore, the wettability control request target pressure is set as the target cathode pressure (FIG. 5D). In addition, if the inter-membrane pressure difference limitation request target pressure is compared with the wettability control request target pressure as this target cathode pressure, the wettability control request target pressure is higher. Therefore the wettability control request target pressure is set as the limitative target cathode pressure (FIG. 5E).

The stack-requested compressor supply flow rate is calculated on the basis of this limitative target cathode pressure. In this timing chart, it is assumed that the stack-requested compressor supply flow rate is higher than the dilution request compressor supply flow rate. Therefore, the stack-requested compressor supply flow rate calculated on the basis of the limitative target cathode pressure and the like is set as the target compressor supply flow rate, so that the cathode compressor 24 is controlled on the basis of the target compressor supply flow rate.

As a result, at the timing t1 to t2, the wettability control request target pressure maintained at a constant value is set as the limitative target cathode pressure. Therefore, the rotation speed of the cathode compressor 24 also becomes constant (FIG. 5F).

At the timing t2, if the electrolyte membrane is excessively soaked, for example, due to water generated through power generation, and the target impedance increases, the wettability control request target pressure is reduced in order to easily discharge the generated water along with the cathode gas by increasing the opening level of the cathode relief valve (FIG. 5C). As a result, the target cathode pressure and the limitative target cathode pressure are also reduced (FIGS. 5D and 5E).

At the timing t3, if the target cathode pressure (wettability control request target pressure) is reduced to be lower than the inter-membrane pressure difference limitation request target pressure (FIG. 5D), the inter-membrane pressure difference limitation request target pressure is set as the limitative target cathode pressure (FIG. 5E).

At the timing t4, if the lower limit pressure increases to be higher than the wettability control request target pressure, the lower limit pressure is set as the target cathode pressure, and the target cathode pressure is also pulsated in response to pulsation of the anode pressure (FIGS. 5C and 5D). If the cathode compressor 24 is controlled on the basis of the pulsating target cathode pressure, the rotation speed of the cathode compressor 24 periodically changes depending on pulsation of the target cathode pressure, so that noise such as a beating sound may be generated from the cathode compressor 24.

In this regard, according to this embodiment, the higher one of the target cathode pressure and the inter-membrane pressure difference limitation request target pressure is set as the limitative target cathode pressure, and the cathode compressor 24 is controlled on the basis of this limitative target cathode pressure.

For this reason, after the timing t3, the cathode compressor 24 is controlled on the basis of the limitative target cathode pressure (inter-membrane pressure difference limitation request target pressure) maintained at a constant value even when the target cathode pressure is pulsated after the timing t4. Therefore, even after the timing t3, the rotation speed of the cathode compressor 24 is maintained constantly, and the rotation speed of the cathode compressor 24 does not change periodically. Therefore, it is possible to suppress generation of noise such as a beating sound from the cathode compressor 24 (FIG. 5F).

At the timing t5, as the target output current of the fuel cell stack 1 decreases, and the anode pressure becomes higher than the pulsation upper-limit target pressure (FIG. 5A), the inter-membrane pressure difference limitation request target pressure becomes lower than the lower limit pressure set as the target cathode pressure (FIGS. 5C and 5D). As a result, the lower limit pressure is set as the limitative target cathode pressure (FIG. 5E).

In this manner, during a reductive transient time in which the target output current decreases, the anode pressure may be temporarily higher than the pulsation upper-limit target pressure, and the lower limit pressure may be higher than the inter-membrane pressure difference limitation request target pressure in some cases. In this case, if the cathode compressor 24 is controlled by setting the inter-membrane pressure difference limitation request target pressure as the limitative target cathode pressure, the inter-membrane pressure difference may exceed the allowable inter-membrane pressure difference.

In this regard, according to this embodiment, considering a case where the lower limit pressure becomes higher than the inter-membrane pressure difference limitation request target pressure during the reductive transient time, the higher one of the inter-membrane pressure difference limitation request target pressure and the target cathode pressure is set as the limitative target cathode pressure.

As a result, when the lower limit pressure becomes higher than the inter-membrane pressure difference limitation request target pressure, the lower limit pressure is set as the limitative target cathode pressure. Therefore, it is possible to suppress the inter-membrane pressure difference from exceeding the allowable inter-membrane pressure difference.

At the timing t6, as the anode pressure decreases to the pulsation upper-limit target pressure (FIG. 5A), the inter-membrane pressure difference limitation request target pressure is set as the limitative target cathode pressure again. As a result, even after the timing t6, the cathode compressor 24 is controlled on the basis of the limitative target cathode pressure (inter-membrane pressure difference limitation request target pressure) maintained at a constant value. Therefore, it is possible to suppress generation of noise such as a beating sound from the cathode compressor 24 (FIG. 5F).

As described above, according to this embodiment, in the fuel cell system 100 operated to pulsate the anode pressure, when the target cathode pressure is pulsated in response to pulsation of the anode pressure, the cathode compressor 24 is controlled on the basis of the limitative target cathode pressure obtained by limiting pulsation of the target cathode pressure and the target stack supply flow rate calculated on the basis of requests from the fuel cell stack 1 such as the oxygen partial pressure obtainment request or the wettability control request.

As a result, it is possible to suppress the rotation speed of the cathode compressor 24 from periodically changing in response to pulsation of the target cathode pressure. Therefore, it is possible to suppress generation of noise such as a beating sound from the cathode compressor 24.

Specifically, the lower limit pressure obtained by subtracting the allowable inter-membrane pressure difference from the anode pressure is set as the target cathode pressure. When the target cathode pressure is pulsated in response to pulsation of the anode pressure, the inter-membrane pressure difference limitation request target pressure obtained by subtracting the allowable inter-membrane pressure difference from the pulsation upper-limit target pressure is set as the limitative target cathode pressure.

The pulsation upper-limit target pressure is fixed to a predetermined value on the basis of the target output current if there is no change in the target output current. Therefore, the inter-membrane pressure difference limitation request target pressure obtained by subtracting the allowable inter-membrane pressure difference from the pulsation upper-limit target pressure is also fixed to any predetermined value.

Therefore, when the target cathode pressure is pulsated in response to pulsation of the anode pressure, the inter-membrane pressure difference limitation request target pressure is set as the limitative target cathode pressure, and the cathode compressor 24 is controlled on the basis of this limitative target cathode pressure. Therefore, it is possible to suppress the rotation speed of the cathode compressor 24 from periodically changing in response to pulsation of the target cathode pressure. Therefore, it is possible to suppress generation of noise such as a beating sound from the cathode compressor 24.

That is, according to this embodiment, in order to maintain a pressure difference between an anode and a cathode of a fuel cell within a predetermined allowable inter-membrane pressure difference range, the lower limit pressure (second target pressure) is set as the target cathode pressure. When the target cathode pressure is pulsated in response to pressure pulsation of the anode gas, the cathode compressor 24 is controlled on the basis of the pressure obtained by limiting pulsation of the target cathode pressure (limitative target cathode pressure=inter-membrane pressure difference limitation request target pressure) and the target stack supply flow rate.

The anode pressure is controlled to be equal to or lower than the pulsation upper-limit target pressure except for the reductive transient time in which the target output current decreases. For this reason, by limiting the lower limit of the cathode pressure with respect to the pulsation upper-limit target pressure as described in this embodiment, it is possible to suppress the inter-membrane pressure difference from exceeding the allowable inter-membrane pressure difference during a pulsation operation. Therefore, it is possible to suppress a decrease of a mechanical strength of the electrolyte membrane and suppress deterioration of the fuel cell.

According to this embodiment, considering a case where the lower limit pressure becomes temporarily higher than the inter-membrane pressure difference limitation request target pressure during the reductive transient time, the higher one of the inter-membrane pressure difference limitation request target pressure and the target cathode pressure is set as the limitative target cathode pressure.

As a result, when the lower limit pressure is set as the target cathode pressure, and the target output current decreases, the lower limit pressure is set as the limitative target cathode pressure. Therefore, it is possible to suppress the inter-membrane pressure difference from exceeding the allowable inter-membrane pressure difference.

Second Embodiment

Next, a description will be made for a second embodiment of this invention. According to the second embodiment, the operation of the cathode gas supply control is different from that of the first embodiment. Hereinafter, a description will be made by focusing on the difference. It is noted that, in the following description for each embodiment, like reference numerals denote like elements as in those of the first embodiment.

Figure 6:
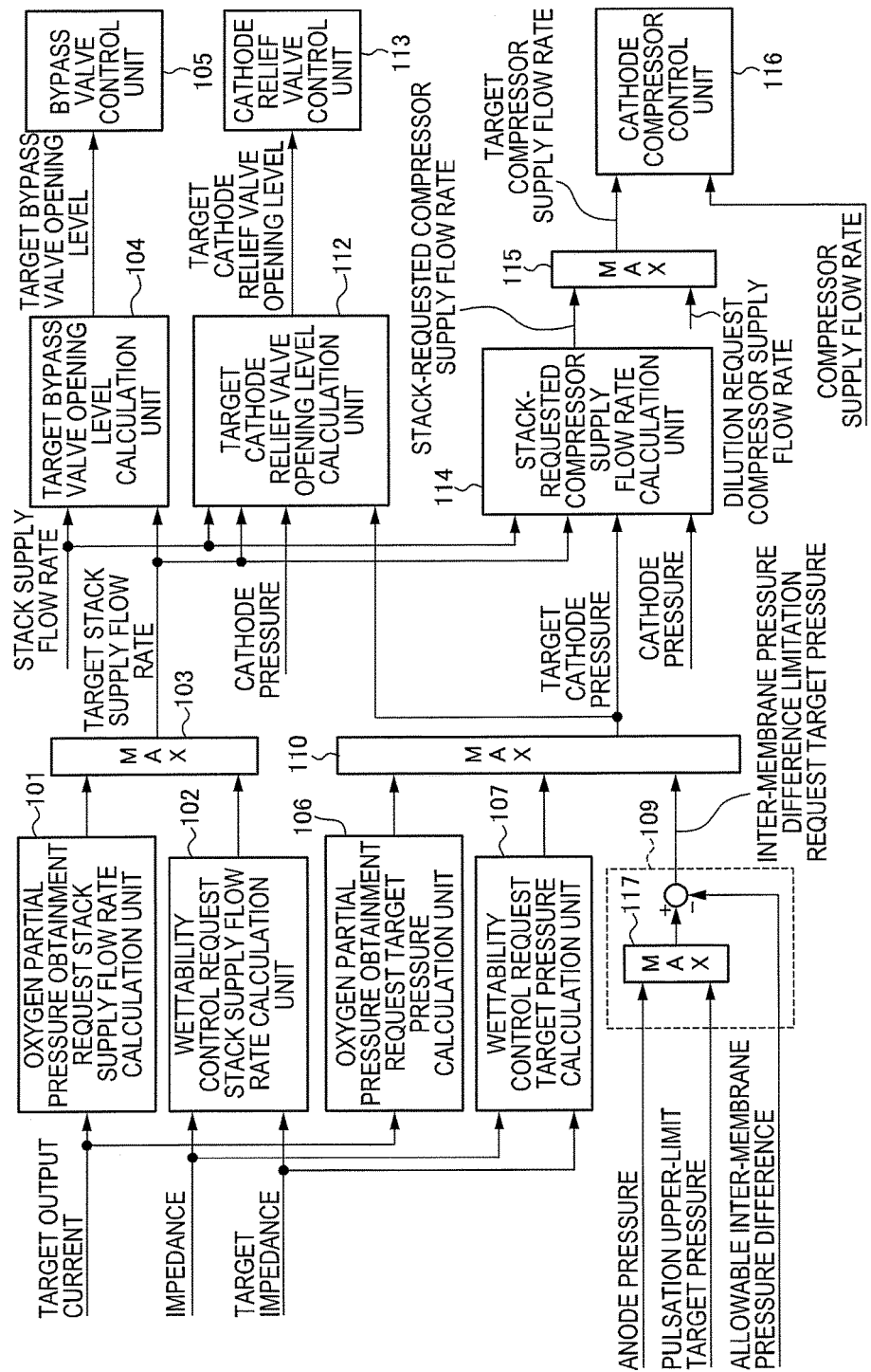
FIG. 6 is a block diagram illustrating a cathode gas supply control according to a second embodiment of this invention.

FIG. 6 is a block diagram illustrating a cathode gas supply control performed by the controller 4 according to this embodiment.

According to this embodiment, a selection unit 117 is provided to select the higher one of the pulsation upper-limit target pressure and the anode pressure, and a pressure obtained by subtracting the allowable inter-membrane pressure difference from the pressure output from the selection unit 117 is set as the inter-membrane pressure difference limitation request target pressure. In addition, this inter-membrane pressure difference limitation request target pressure is input to the target cathode pressure calculation unit 110 as a second target pressure.

In this manner, according to this embodiment, the controller 4 (second target pressure setting unit) sets, as the second target pressure, a limitative pressure (inter-membrane pressure difference limitation request target pressure) obtained by limiting the pressure pulsation of the cathode gas generated in response to pressure pulsation of the anode gas. In addition, the controller 4 (target pressure setting unit) sets the higher one of the first and second target pressures as a target pressure of the cathode gas supplied to the fuel cell stack (target cathode pressure). Furthermore, basically, the controller 4 (control unit) controls the cathode compressor 24 on the basis of the target flow rate (target stack supply flow rate) and the target pressure (target cathode pressure).

Figure 7:
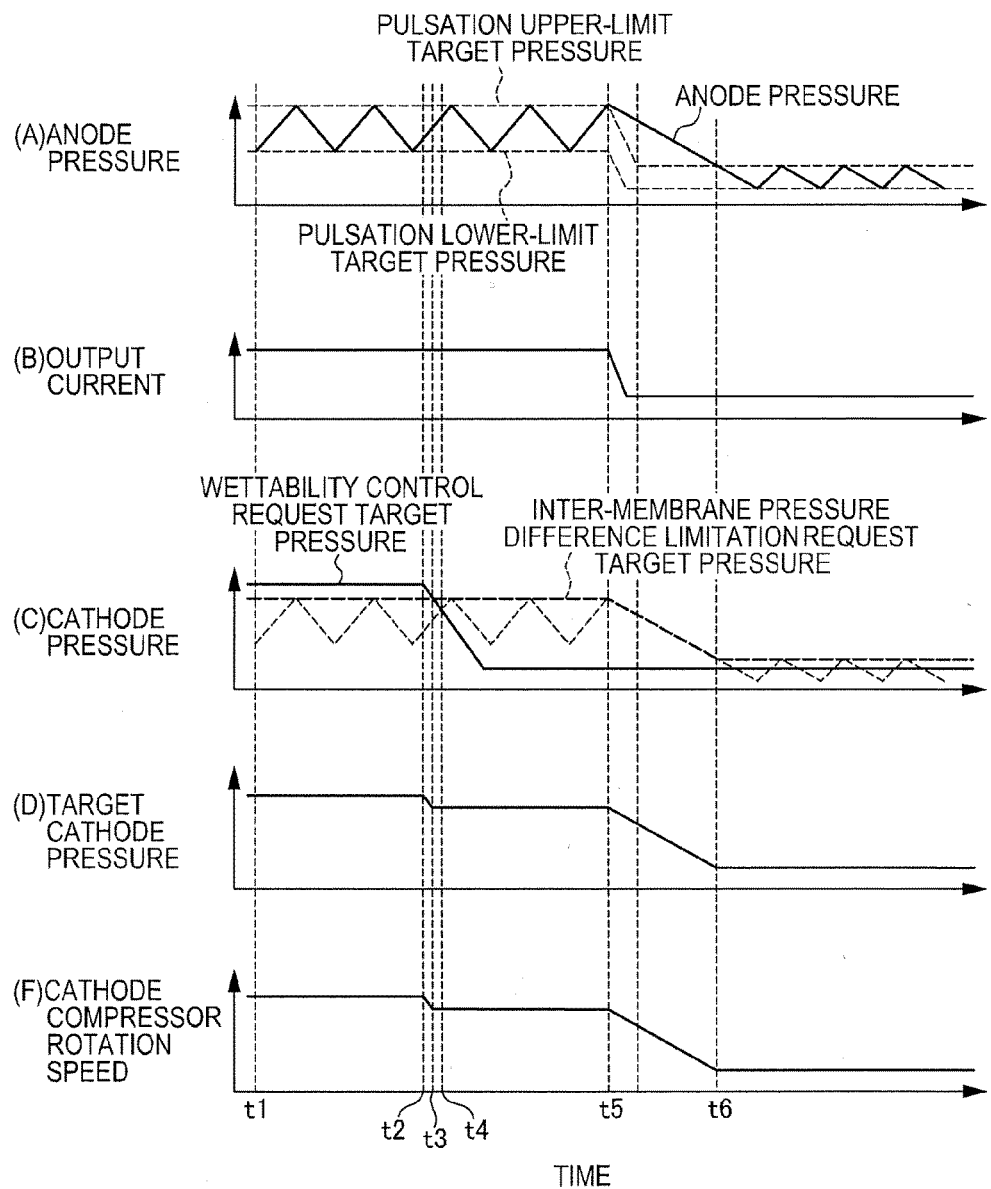
FIG. 7 is a timing chart illustrating operations of the anode gas supply control and the cathode gas supply control according to the second embodiment of this invention.

FIG. 7 is a timing chart illustrating operations of the anode gas supply control and the cathode gas supply control according to this embodiment.

By constructing the control block as described above, according to this embodiment, the highest one of the oxygen partial pressure obtainment request pressure, the wettability control request target pressure, and the inter-membrane pressure difference limitation request target pressure is calculated as the target cathode pressure, and the cathode compressor 24 is controlled on the basis of this target cathode pressure.

Therefore, as illustrated in FIG. 7, from the timing t3 to the timing t5 where the target output current decreases, the inter-membrane pressure difference limitation request target pressure obtained by subtracting the allowable inter-membrane pressure difference from the pulsation upper-limit target pressure is set as the target cathode pressure (FIGS. 7C and 7D). For this reason, the cathode compressor 24 is controlled on the basis of the target cathode pressure maintained at a constant value. Therefore, it is possible to suppress generation of noise such as a beating sound from the cathode compressor 24 (FIG. 7F).

At the timing t5 to t6 corresponding to the reductive transient time, the inter-membrane pressure difference limitation request target pressure obtained by subtracting the allowable inter-membrane pressure difference from the anode pressure is set as the target cathode pressure (FIGS. 7C and 7D). For this reason, it is possible to suppress the inter-membrane pressure difference during the reductive transient time from exceeding the allowable inter-membrane pressure difference.

After the timing t6, the inter-membrane pressure difference limitation request target pressure obtained by subtracting the allowable inter-membrane pressure difference from the pulsation upper-limit target pressure is set as the target cathode pressure again. For this reason, the cathode compressor 24 is controlled on the basis of the target cathode pressure maintained at a constant value again. Therefore, it is possible to suppress generation of noise such as a beating sound from the cathode compressor 24.

As described above, according to this embodiment, the inter-membrane pressure difference is maintained within an allowable inter-membrane pressure difference range in order to prevent the inter-membrane pressure difference limitation request target pressure for protecting the electrolyte membrane from being pulsated in response to pressure pulsation of the anode gas, and a pressure obtained by limiting pulsation caused by pressure pulsation of the anode gas is set as the inter-membrane pressure difference limitation request target pressure. Specifically, a pressure obtained by subtracting the allowable inter-membrane pressure difference from the higher one of the pulsation upper-limit target pressure and the anode pressure is set as the inter-membrane pressure difference limitation request target pressure.

As a result, except for the reductive transient time, the pressure obtained by subtracting the allowable inter-membrane pressure difference from the pulsation upper-limit target pressure is set as the inter-membrane pressure difference limitation request target pressure. Therefore, when the inter-membrane pressure difference limitation request target pressure is set as the target cathode pressure, it is possible to control the cathode compressor 24 on the basis of the target cathode pressure maintained at a constant value. Accordingly, it is possible to obtain the same effects as those of the first embodiment and suppress generation of noise such as a beating sound from the cathode compressor 24.

Although embodiments of this invention have been described hereinbefore, they are just for illustrative purposes for showing only a part of applications of the invention, and are not intended to specifically limit the scope of the invention to those configurations of the embodiments.

Figure 8:
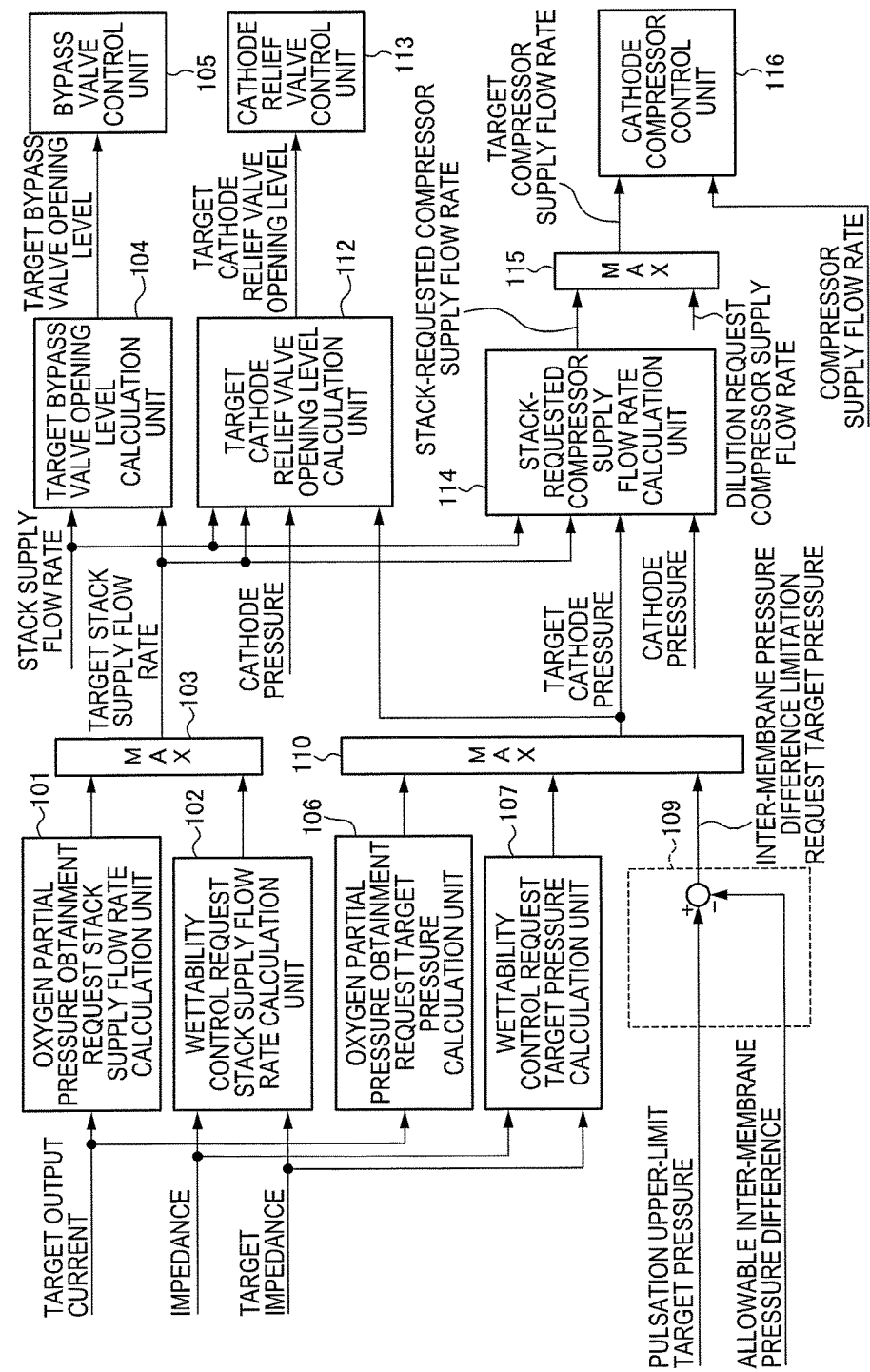
FIG. 8 is a block diagram illustrating a cathode gas supply control according to another embodiment of this invention.

For example, according to the second embodiment, the pressure obtained by subtracting the allowable inter-membrane pressure difference from the higher one of the pulsation upper-limit target pressure and the anode pressure as the inter-membrane pressure difference limitation request target pressure is input to the target cathode pressure calculation unit 110. Alternatively, when the anode pressure is pulsated by setting the pulsation upper-limit target pressure and the pulsation lower-limit target pressure to preset fixed values without changing them depending on the target output current, a control block for the cathode gas supply control may be configured as illustrated in FIG. 8.

That is, if the pulsation upper-limit target pressure and the pulsation lower-limit target pressure are set to preset fixed values, the pulsation upper-limit target pressure and the pulsation lower-limit target pressure do not change even when the target output current decreases. Therefore, the pulsation upper-limit target pressure does not change to be lower than the anode pressure. For this reason, as illustrated in FIG. 8, the inter-membrane pressure difference limitation request target pressure calculation unit 109 may calculate the pressure obtained by subtracting the allowable inter-membrane pressure difference from the pulsation upper-limit target pressure as the inter-membrane pressure difference limitation request target pressure and input the pressure into the target cathode pressure calculation unit 110.

Alternatively, in the first embodiment, the higher one of the pressure obtained by subtracting the allowable inter-membrane pressure difference from the pulsation upper-limit target pressure (pulsation upper-limit pressure) of the anode gas and the pressure obtained by subtracting the allowable inter-membrane pressure difference from the anode pressure may be set as the inter-membrane pressure difference limitation request target pressure (limitative pressure).

The present application claims propriety based on Japanese Patent Application No. 2013-145701 filed with Japan patent office on Jul. 11, 2013 all of which are incorporated herein by reference.

The invention claimed is:

1. A fuel cell system that generates power by supplying anode and cathode gases to a fuel cell, comprising:
   a compressor configured to adjust a flow rate of the cathode gas supplied to the fuel cell;
   a relief valve configured to adjust a pressure of the cathode gas supplied to the fuel cell;
   a pulsation operation unit configured to pulsate an anode gas pressure;
   a target flow rate setting unit configured to set a target flow rate of the cathode gas on the basis of a request from the fuel cell;
   a first target pressure setting unit configured to set a first target pressure of the cathode gas on the basis of a request from the fuel cell;
   a second target pressure setting unit configured to set a second target pressure of the cathode gas for maintaining a pressure difference between an anode and a cathode of the fuel cell within a predetermined allowable pressure difference range;
   a target pressure setting unit configured to set the higher one of the first and second target pressures as a target pressure; and
   a control unit configured to control the compressor and the relief valve on the basis of the target flow rate and the target pressure,
   wherein the control unit controls the compressor on the basis of the target flow rate and a limitative pressure obtained by limiting pulsation of the target pressure when the target pressure is pulsated in response to pressure pulsation of the anode gas.

2. The fuel cell system according to claim 1, wherein the limitative pressure is obtained by subtracting the allowable pressure difference from a pulsation upper-limit pressure of the anode gas.

3. The fuel cell system according to claim 1, wherein the pulsation operation unit has a change unit configured to change a pulsation upper-limit pressure and a pulsation lower-limit pressure of the anode gas on the basis of a load of the fuel cell, and
   the limitative pressure is set to the higher one of a pressure obtained by subtracting the allowable pressure difference from the pulsation upper-limit pressure of the anode gas and a pressure obtained by subtracting the allowable pressure difference from the anode gas pressure.

4. The fuel cell system according to claim 1, wherein the first target pressure setting unit has
   an oxygen partial pressure obtainment request pressure calculation unit configured to calculate an oxygen partial pressure obtainment request pressure necessary to maintain the oxygen partial pressure of the fuel cell at a predetermined value or higher on the basis of a load of the fuel cell,
   a target wettability calculation unit configured to calculate target wettability of an electrolyte membrane on the basis of the load of the fuel cell, and
   a wettability control request pressure calculation unit configured to calculate a wettability control request pressure necessary to control the wettability of the electrolyte membrane to the target wettability, and
   the first target pressure is set on the basis of the oxygen partial pressure obtainment request pressure and the wettability control request pressure.

5. A fuel cell system that generates power by supplying anode and cathode gases to a fuel cell, comprising:
   a compressor configured to adjust a flow rate of the cathode gas supplied to the fuel cell;
   a relief valve configured to adjust a pressure of the cathode gas supplied to the fuel cell;
   a pulsation operation unit configured to pulsate an anode gas pressure;
   a target flow rate setting unit configured to set a target flow rate of the cathode gas on the basis of a condition of the fuel cell;
   a first target pressure setting unit configured to set a first target pressure of the cathode gas on the basis of a condition of the fuel cell;
   a second target pressure setting unit configured to set a second target pressure of the cathode gas for maintaining a pressure difference between an anode and a cathode of the fuel cell within a predetermined allowable pressure difference range;
   a target pressure setting unit configured to set the higher one of the first and second target pressures as a target pressure; and
   a control unit configured to control the compressor and the relief valve on the basis of the target flow rate and the target pressure,
   wherein the second target pressure setting unit sets a limitative pressure obtained by limiting pressure pulsation of the cathode gas caused by pressure pulsation of the anode gas as the second target pressure.

6. The fuel cell system according to claim 5, wherein the limitative pressure is obtained by subtracting the allowable inter-membrane pressure difference from the higher one of the pulsation upper-limit target pressure and the anode pressure.

7. A method of controlling a fuel cell system that generates power by supplying anode and cathode gases to a fuel cell, the fuel cell system having a compressor configured to adjust a flow rate of the cathode gas supplied to the fuel cell and a relief valve configured to adjust a pressure of the cathode gas supplied to the fuel cell, the method comprising:
   a pulsation operation process for pulsating an anode gas pressure;
   a target flow rate setting process for setting a target flow rate of the cathode gas on the basis of a request from the fuel cell;
   a first target pressure setting process for setting a first target pressure of the cathode gas on the basis of a request from the fuel cell;
   a second target pressure setting process for setting a second target pressure of the cathode gas for maintaining a pressure difference between an anode and a cathode of the fuel cell within a predetermined allowable pressure difference range;
   a target pressure setting process for setting the higher one of the first and second target pressures as a target pressure;
   a control process for controlling the compressor and the relief valve on the basis of the target flow rate and the target pressure,
   wherein, in the control process, the compressor is controlled on the basis of the target flow rate and a limitative pressure obtained by limiting pulsation of the target pressure when the target pressure is pulsated in response to pressure pulsation of the anode gas.

* * * * *